United States Patent [19]
Parry

[11] Patent Number: 5,886,861
[45] Date of Patent: Mar. 23, 1999

[54] APPARATUS PROVIDING RESPONSE TO ARC FAULTS IN A POWER DISTRIBUTION CABLE PROTECTED BY CABLE LIMITERS

[75] Inventor: Robert Neville Parry, Beaver, Pa.

[73] Assignee: Eaton Corporation, Cleveland, Ohio

[21] Appl. No.: 929,636

[22] Filed: Sep. 15, 1997

[51] Int. Cl.$^6$ ...................................................... H02H 3/00
[52] U.S. Cl. ................................ 361/42; 361/62; 361/93; 361/115
[58] Field of Search ..................................... 361/103, 104, 361/106, 115, 93, 62, 64, 66, 42, 48

[56] References Cited

U.S. PATENT DOCUMENTS

| | | | |
|---|---|---|---|
| 3,750,075 | 7/1973 | Cooper, Jr. | 337/158 |
| 4,314,300 | 2/1982 | Griffith | 361/13 |
| 5,224,006 | 6/1993 | Mackenzie et al. | 361/45 |
| 5,452,223 | 9/1995 | Zuercher et al. | 364/483 |
| 5,519,561 | 5/1996 | Mrenna et al. | 361/105 |

*Primary Examiner*—Jeffrey Gaffin
*Assistant Examiner*—Stephen Jackson
*Attorney, Agent, or Firm*—Martin J. Moran

[57] ABSTRACT

An arc fault detector turns on an electronic switch connecting a power distribution cable to ground thereby actuating a cable limiter to isolate the power distribution cable in response to an arc fault even though the arc fault itself does not create a low enough impedance fault to actuate the cable limiter directly. The electronic switch can be a sacrificial low cost silicon controlled rectifier which is destroyed by the ground fault it creates as long as the let-through current of the cable limiter is below the explosion current of the SCR. A single arc fault detector and SCR which fails as a short circuit can be used to actuate cable limiters at both ends of a short power distribution cable fed at both ends, or preferably separate protection can be provided adjacent both cable limiters.

11 Claims, 2 Drawing Sheets

APPARATUS PROVIDING RESPONSE TO ARC FAULTS IN A POWER DISTRIBUTION CABLE PROTECTED BY CABLE LIMITERS

BACKGROUND OF THE INVENTION

FIELD OF THE INVENTION

This invention relates to protecting cables in electric power distribution networks, and particularly networks in which the cables are protected by cable limiters which, by themselves, are insensitive to arcing faults. Specifically, it relates to sacrificial arc fault circuitry which generates a deliberate ground fault to actuate the cable limiters.

BACKGROUND INFORMATION

Low voltage networks, typically 600 volts and below, are used to distribute electric power in a specified area, such as part of a city or an industrial or commercial installation. Often, the cables in such networks are located underground. Typically, the network is fed at more than one point, and therefore, has multiple sources. Occasionally, the cables fail due to various causes such as thermal degradation, age, moisture, and rodent damage. The networks are protected by circuit breakers; however, in order to isolate the faulty cable, and therefore minimize disruption of the network, cable limiters are provided at the ends of the cables. Cable limiters are fuse-like devices which only react safely to large magnitude, low impedance faults, such as are created by phase to phase faults. However, often an arcing type fault to ground occurs rather than a phase to phase fault. Such faults are low current, high impedance faults to which the cable limiters do not respond.

There is a need, therefore, for apparatus which will isolate a cable in a power distribution network in the event of an arcing type fault. While a circuit breaker responsive to arcing faults could be used, it is preferred that a lower cost solution be found. It is also necessary that the network retain protection of the cables against high current, low impedance faults such as phase to phase faults.

SUMMARY OF THE INVENTION

In response to these needs, and others, the invention is directed to apparatus which utilizes the currently provided cable limiter to isolate an arcing type fault in the cable even though the cable limiter cannot directly respond to such a fault. An arcing fault detector, such as those used in circuit breakers, is employed to detect the presence of an arcing condition and to actuate an electronic switch connected between the affected cable and the ground, thereby creating a high current, low impedance ground fault which actuates the cable limiter. For this purpose, a low cost silicon controlled rectifier (SCR) can be used as the electronic switch. The SCR will fail; however, the cable and cable limiter will have to be replaced in any event, and a sacrificial SCR adds insignificant cost to the replacement.

When a cable is feed at both ends, each equipped with a cable limiter, a single arc detector and electronic switch to ground could provide the low impedance, ground fault needed to actuate both cable limiters to isolate the faulted cable. It is preferred, however, particularly for lengthy cables, that the low cost arc fault detectors and electronic switches be provided adjacent each end of the cable. Alternatively, a single arc detector could actuate the separate switches at each end of the cable, or a single electronic switch could be actuated by more than one arc fault detector.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
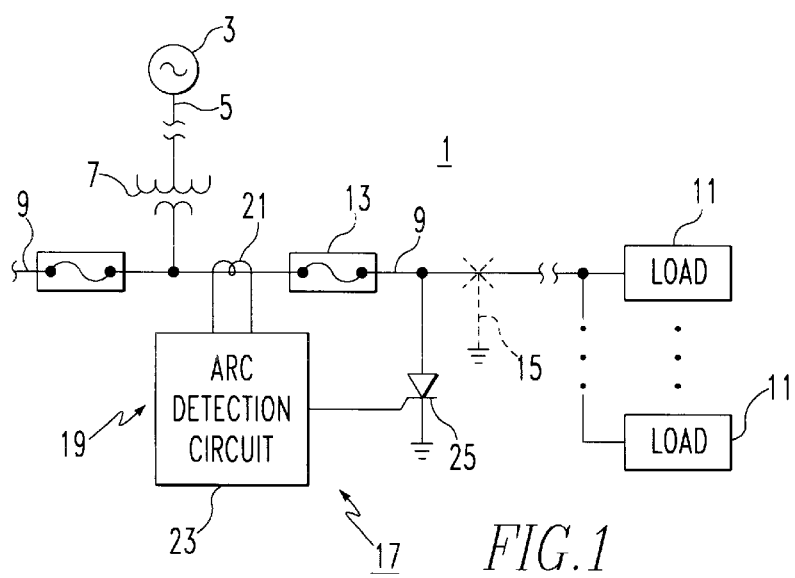
FIG. 1 is a schematic diagram of a portion of a low voltage power distribution network in which a cable is protected in accordance with the invention.

FIG. 1 illustrates a low voltage electric power distribution network 1. Network 1 is energized by a source 3 which provides power over a transmission system 5. The network 1 includes a transformer 7 which steps down the transmitted power to the lower voltage of the network, which as mentioned, is typically 600 volts or below.

The network 1 includes an array of cables 9 for distributing power to a variety of loads 11 on the network. For purposes of illustration, a very simple arrangement is shown in FIG. 1 in which a cable 9 is connected at one end to the feeder transformer 7 and at the other end to a load 11. Typically, the network would have a number of circuit breakers (not shown) which would respond to faults at various locations throughout the network 1. In addition, the cables 9 in the network are provided with cable limiters 13 in order to isolate a faulty cable. It is not economical to provide the individual cables with circuit breakers, however, by isolating a faulty cable, disruption of the network is kept to a minimum. The cable limiters 13 are "partial range" fuses that, as mentioned previously, only react safely to large magnitude, low impedance faults. However, as also mentioned above, arcing faults, such as 15, can occur in a cable 9. Typically, the arcing fault is a fault to ground although series arcing faults can occur such as where a conductor within the cable is broken. Arcing faults are low current, high impedance phenomena to which the cable limiters do not respond.

The invention provides a simple, novel arrangement for isolating cables having arcing faults. Arc fault cable protector 17 generates a deliberate high current, low impedance ground fault to which the cable limiter 13 responds to isolate the faulty cable. The arc fault protector 17 includes an arc fault detector 19. Various types of arc fault detectors are available for this purpose. Generally, arc fault detectors fall into two types. The first type responds to the high frequency noise created by the arc. Various characteristics of this high frequency noise are monitored in order to minimize false detection in response to similar types of noise generated by some kinds of loads. An example of an arc fault detector of this type is disclosed in U.S. Pat. No. 5,452,223. A second type of arc fault detector looks for random step increases in current generated by the repetitive striking of a sputtering arc. An example of this second type of arc fault detector is disclosed in U.S. Pat. No. 5,224,006.

In either case, the arc fault detector 19 includes a current sensor 21 for sensing the current in the protected cable 9. Such a current sensor can take the form of a current transformer 21 as shown in FIG. 1. The arc fault detector 19 further includes arc fault detection circuitry 23 which analyzes the current sensed by the current sensor 21 and generates an arc fault signal when an arcing fault is detected. The arc fault signal is used to actuate an electronic switch 25 which also forms part of the arc fault protector 17. Various types of electronic switches can be utilized, however, the silicon controlled rectifier (SCR) is preferred because of its low cost. The SCR is connected between the cable 9 and ground. The gate electrode of the SCR 25 is connected to the arc fault circuitry 23 so that the arc fault signal turns on the SCR in response to detection of arcing in the cable to generate a deliberate ground fault. This low impedance fault on the load side of the cable limiter 13 will draw a high current through the cable limiter sufficient for the limiter to actuate and isolate the cable 9. The presence of the arc fault protector 17 does not inhibit the response of the cable limiter 13 to high current, low impedance faults such as would be caused by phase to phase faults in the cable 9. The cable limiter responds to high current, low impedance faults, whether phase to phase or the deliberate ground fault generated by the arc fault protector, in less than a cycle. Typically, the arcing fault detectors require at least a couple of cycles or more to identify an arcing fault, but they do not interfere with the cable limiters' rapid response to a phase to phase fault.

The high current generated by the deliberate ground fault resulting from actuation of the switch 25 will cause the switch 25 to fail. However, it fails as a short circuit. Thus, the electronic switch 25 is sacrificed along with the cable limiter. As the SCR is a relatively low cost item, and the cable limiter must be replaced in any event, the invention does not significantly add to the cost of protection. Therefore, the SCR 25 does not need to be "fully rated" to withstand the full ground current of the deliberate fault. However, it is necessary to insure that the short circuit let through current of the cable limiter 13 does not exceed the explosion rating of the SRC 25.

Figure 2:
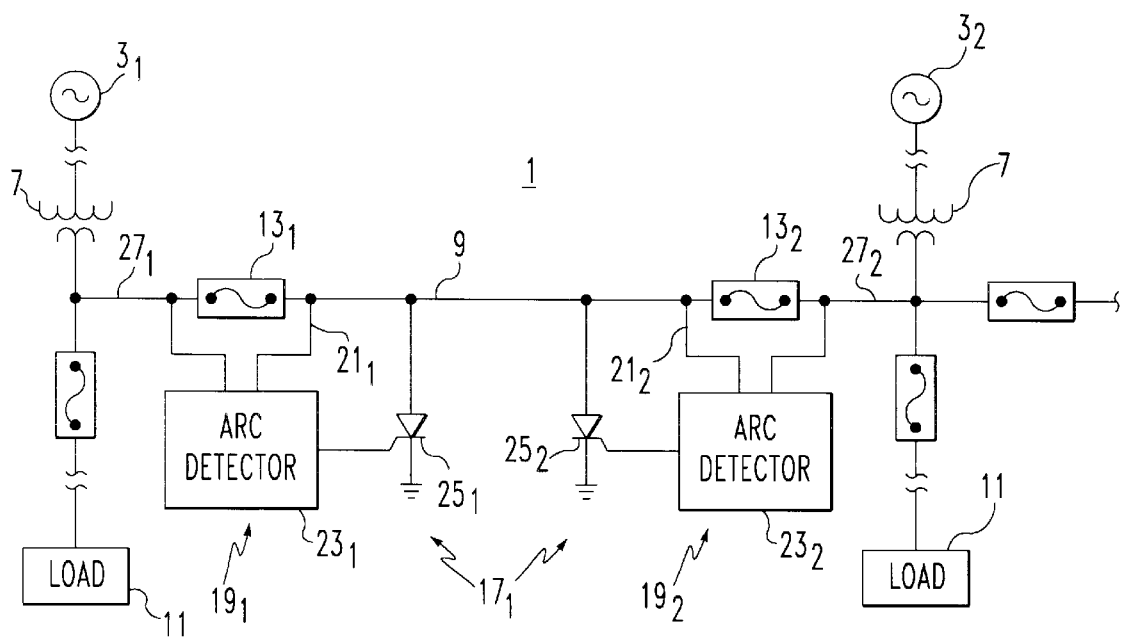
FIG. 2 is a schematic diagram of a portion of another low voltage power distribution network in which a cable fed at both ends is protected in accordance with a preferred embodiment of the invention.

FIG. 2 illustrates another embodiment of the invention in which the cable 9 is fed at both ends by two sources $3_1$ and $3_2$ through transformers 7. In this case, the cable 9 is provided at a first end $27_1$ with a first cable limiter $13_1$ and at the second end $27_2$ with a second cable limiter $13_2$. The arc fault protector $17_1$ includes a first arc fault detector $19_1$ associated with the first cable limiter $13_1$ and a second arc fault detector $19_2$ associated with the second cable limiter $13_2$. While current transformers could be used for sensing cable current as in the embodiment shown in FIG. 1, the current sensors $21_1$ and $21_2$ in the embodiment of the FIG. 2 utilize the cable limiters $13_1$ and $13_2$ themselves for sensing current. U.S. Pat. No. 5,519,561 discloses that the bi-metal of the thermomagnetic trip unit of a circuit breaker can be used to detect arcing current since the resistance of the bi-metal, though very low, is known. A current through the known resistance generates a voltage representative of the current. Thus, the current sensors $21_1$ and $21_2$ provide a measure of the voltage drop across the known resistance of the cable limiters $13_1$ and $13_2$ to provide an indication of cable current to arc fault detection circuitry $23_1$ and $23_2$. Arc fault signals generated by the circuits $23_1$ and $23_2$ actuate the SCRs $25_1$ and $25_2$, respectively, to generate ground faults which draw sufficient current through the respective cable limiters $13_1$ and $13_2$ to actuate them and thereby isolate the cable 9 by open circuiting each end of the cable.

The arrangement of FIG. 2 is preferred for a double-fed cable 9, especially where the cable is of a length to have a sufficiently sizable impedance that could mask an arc fault occurring near one end of the cable if the only arc fault detector were at the other end of the cable.

Figure 3:
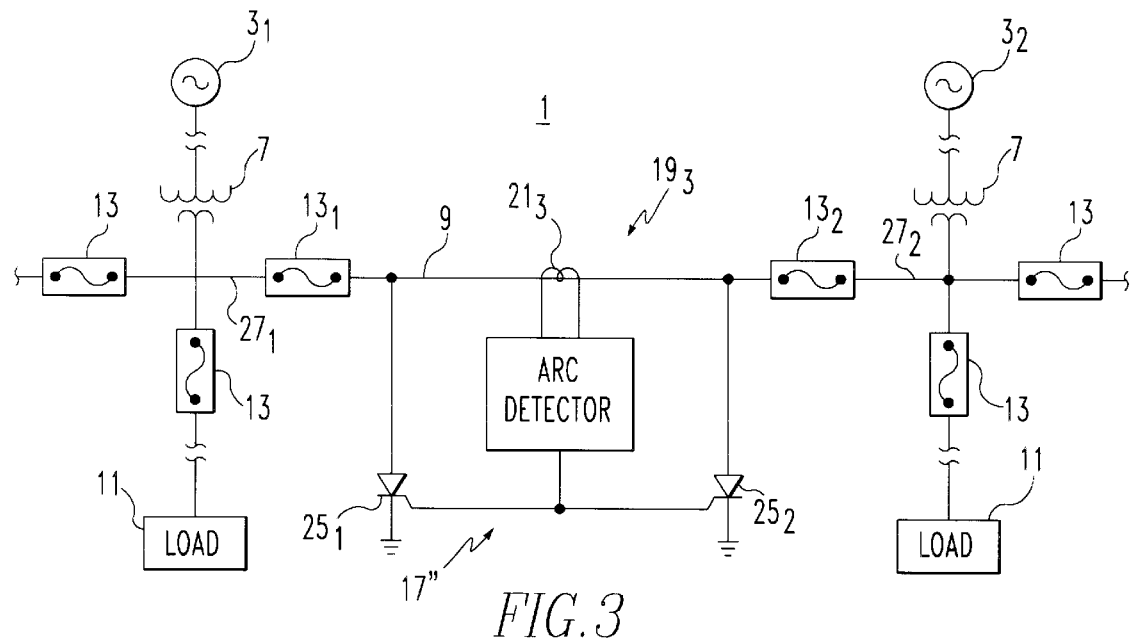
FIG. 3 is a schematic diagram of another embodiment of the invention for protecting a double fed cable.
Figure 4:
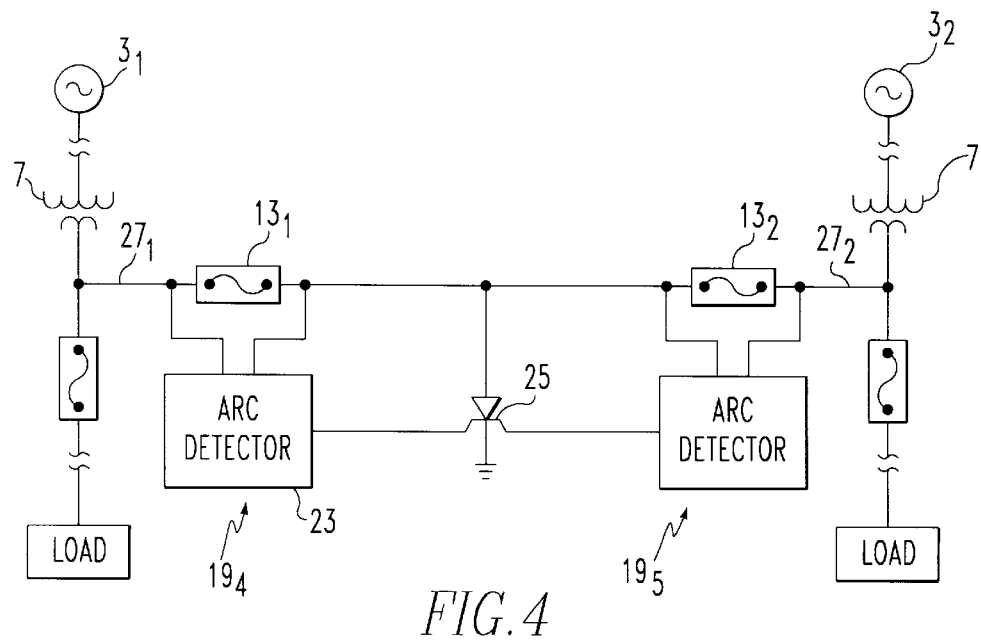
FIG. 4 is a schematic diagram of yet another embodiment of the invention for protecting a double fed cable.

For shorter cables 9, it is possible to reduce the circuitry. For instance as shown in FIG. 3, the arc fault protector $17_2$ can comprise a single arc fault detector $19_3$ with a current sensor $21_3$ located near the center of the cable 9. In the arrangement shown, the single arc fault detecting circuit 23 provides arc fault signals to the gates of SCRs $25_1$ and $25_2$ connected to the cable adjacent the cable limiters $13_1$ and $13_2$ and ground. In another arrangement shown in FIG. 4, arc fault detectors $19_1$ and $19_2$ are provided at each of the cable limiters $13_1$ and $13_2$; however, the arc fault signals detected by the arc fault detection circuits $23_1$ and $23_2$ both actuate a single SCR 25. While one of the cable limiters $13_1$ or $13_2$ will actuate first and cause the SCR 25 to fail, since the SCR fails as a short circuit the deliberate ground fault remains for actuation of the other cable limiter. Of course, the embodiments of FIGS. 2 and 3 provide a redundancy in the SCRs so that should the SCR be destroyed, there is an alternate path to ground for actuation of the other cable limiter.

While various arrangements of the arc detection circuits and electronic switches can be employed in accordance with the invention, it is important to a double fed cable that cable limiters 13 be provided at both ends of a double fed since the failed SCR will provide a continuing ground fault.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. An apparatus for protecting a power distribution cable fed at first and second ends by first and second power sources, said apparatus comprising:
    a first cable limiter connected between said first end of said power distribution cable and said first power source;
    a second cable limiter connected between said second end of said power distribution cable and said second power source;
    an arc fault detection means coupled with said power distribution cable and generating an arc fault indication in response to an arcing fault in said power distribution cable; and
    electronic switch means connected between said power distribution cable and ground between said first cable limiter and said second cable limiter and actuated by said arc fault indication from said arc fault detection means to connect said power distribution cable to ground through low impedance such that both said first cable limiter and second cable limiter are actuated to isolate said power distribution cable from said first power source and said second power source.

2. The apparatus of claim 1 wherein said arc fault detector comprises a first current sensor sensing current in said power distribution cable adjacent to said first cable limiter and a first arc fault circuit connected to said first current sensor and generating a first arc fault signal in response to an arcing fault in said power distribution cable, and a second current sensor sensing current in said power distribution cable adjacent to second cable limiter, and a second arc fault circuit connected to said second current sensor and generating a second arc fault signal in response to an arc fault in said power distribution cable, said at least one electronic switch being actuated by either said first arcing signal or said second arcing signal.

3. The apparatus of claim 1 wherein said arc fault detection means comprises at least one current sensor sensing current in said power distribution cable and at least one arc fault circuit connected to said at least one current sensor and generating at least one arc fault signal as said indication of an arc fault in said power distribution cable, and wherein said electronic switch means comprises at least one electronic switch which is actuated by said at least one arc fault signal to connect said power distribution cable to ground to produce at least one low impedance ground fault which actuates both said first cable limiter and said second cable limiter.

4. The apparatus of claim 3 wherein said electronic switch means comprises a first electronic switch connected between said power distribution cable and ground adjacent said first cable limiter and a second electronic switch connected between said power distribution cable and ground adjacent said second cable limiter.

5. The apparatus of claim 4 wherein said arc fault detection means comprises a first current sensor sensing current in said power distribution cable adjacent said first cable limiter and a first arc fault circuit connected to said first current sensor and generating a first arc fault signal for actuating said first electronic switch, and a second current sensor sensing current in said power distribution cable adjacent to said second cable limiter, and a second arc fault detection circuit connected to said second current sensor and generating a second arc fault signal actuating said second electronic switch.

6. The apparatus of claim 3 wherein said at least one electronic switch is a silicon controlled rectifier (SCR).

7. The apparatus of claim 6 wherein said first cable limiter and second cable limiter each have a specified let-through current and wherein said at least one SCR is selected to have an explosion current which is less than said specified let-through currents.

8. The apparatus of claim 3 wherein said arc fault detector comprises at least one current sensor including a pair of leads connected across one of said cable limiters and an arc fault detection circuit connected to said pair of leads and generating an arc fault signal in response to an arcing fault in said power distribution cable, said at least one electronic switch being actuated by said arcing fault signal.

9. The apparatus of claim 8 wherein said at least one electronic switch comprises a silicon controlled rectifier (SCR).

10. Apparatus for responding to arcing faults in a power distribution cable fed by a power source and protected by a cable limiter, said apparatus comprising:
    an arc fault detector coupled with said power distribution cable and generating an arc fault signal in response to an arcing fault in said power distribution cable;
    an electronic switch connected between said power distribution cable and ground and actuated by said arc fault signal to produce a low impedance ground fault between said power distribution cable and ground which actuates said cable limiter to interrupt flow of current in said power distribution cable; and
    wherein said arc fault detector includes a current sensor comprising a pair of leads connected across said cable limiter, and an arc fault detection circuit connected to said leads and generating said arc fault signal.

11. The apparatus of claim 10 wherein said electronic switch is a silicon controlled rectifier (SCR).

* * * * *